United States Patent
Laun

(10) Patent No.: US 11,927,468 B2
(45) Date of Patent: Mar. 12, 2024

(54) EXTERNAL RADIATION DETECTION WITH A GAMMA MODULATOR

(71) Applicant: VEGA Grieshaber KG, Wolfach (DE)

(72) Inventor: Robert Laun, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 381 days.

(21) Appl. No.: 17/268,025

(22) PCT Filed: Sep. 12, 2019

(86) PCT No.: PCT/EP2019/074382
§ 371 (c)(1),
(2) Date: Feb. 11, 2021

(87) PCT Pub. No.: WO2020/053343
PCT Pub. Date: Mar. 19, 2020

(65) Prior Publication Data
US 2021/0181006 A1    Jun. 17, 2021

(30) Foreign Application Priority Data
Sep. 14, 2018    (DE) ...................... 10 2018 215 675.1

(51) Int. Cl.
*G01T 1/17* (2006.01)
*G01F 23/288* (2006.01)
*G01T 1/178* (2006.01)

(52) U.S. Cl.
CPC .............. *G01F 23/288* (2013.01); *G01T 1/17* (2013.01); *G01T 1/178* (2013.01)

(58) Field of Classification Search
CPC .......... G01F 23/288; G01T 1/17; G01T 1/178
See application file for complete search history.

(56) References Cited

U.S. PATENT DOCUMENTS 5,646,409 A * 7/1997 Leisinger .................. G01T 7/00
  250/369
8,324,572 B2 * 12/2012 Nistor .................... G01S 11/125
  250/357.1

(Continued)

FOREIGN PATENT DOCUMENTS

DE    42 33 278 A1    4/1994
DE    195 40 182 A1    4/1997

(Continued)

OTHER PUBLICATIONS

International Search Report dated Nov. 27, 2019 in PCT/EP2019/074382 filed on Sep. 12, 2019, 2 pages.

(Continued)

*Primary Examiner* — Christine S. Kim
(74) *Attorney, Agent, or Firm* — Oblon, McClelland, Maier & Neustadt, L.L.P.

(57) ABSTRACT

A radiometric measuring device for determining an intensity of pulses of an interference signal from an external radiation source, wherein the radiometric measuring device carries out fill level or limit level determination of a filling material in a container. The radiometric measuring device has a detector which is configured to receive pulses of a useful signal modulated with a modulation frequency from a gamma emitter and additionally pulses of the interference signal from the external radiation source. Further, the measuring device comprises an averager configured to output a first count rate of the pulses at an averager output, and a bandpass system comprising a bandpass with adjustable passband frequency range configured to output a second count rate of the pulses at a bandpass system output. The measuring device further comprises a subtractor adapted to form a differential count rate between the first count rate and the second count rate.

13 Claims, 4 Drawing Sheets

(56) References Cited

U.S. PATENT DOCUMENTS

| | | | |
|---|---|---|---|
| 10,101,192 B2 * | 10/2018 | Glaser | G01F 23/2845 |
| 2002/0181662 A1 * | 12/2002 | Pfleger | G01T 7/00 |
| | | | 378/207 |
| 2004/0025569 A1 | 2/2004 | Damm et al. | |

FOREIGN PATENT DOCUMENTS

| | | |
|---|---|---|
| DE | 101 32 267 A1 | 1/2003 |
| DE | 20 2015 103 673 U1 | 9/2015 |
| DE | 10 2016 222 298 A1 | 5/2018 |
| EP | 2 354 809 A2 | 8/2011 |
| WO | WO 97/15823 A2 | 5/1997 |
| WO | WO 2008/077940 A1 | 7/2008 |

OTHER PUBLICATIONS

International Preliminary Report on Patentability and Written Opinion dated Mar. 25, 2021 in PCT/EP2019/074382, 8 pages (submitting English Translation only).

German Office Action dated Jul. 18, 2019 in German Patent Application No. 10 2018 215 675.1, 5 pages.

\* cited by examiner

EXTERNAL RADIATION DETECTION WITH A GAMMA MODULATOR

REFERENCE TO RELATED APPLICATION

This application claims priority to German Patent Application No. 10 2018 215 675.1, filed 14-09-2018, which is incorporated herein by reference in its entirety.

FIELD OF THE INVENTION

The invention relates to a radiometric measuring device for determining an intensity of an interfering signal from an external radiation source, wherein the radiometric measuring device is configured to perform a fill level measurement or a limit level measurement of a fill material in a container. Furthermore, the invention relates to a use of such a measuring device for fill level measurement or limit level measurement, a month for determining an intensity of an interfering signal, and a use of the measuring device, a program element and a computer-readable medium, on which such a program element is stored.

BACKGROUND

Radiometric measuring devices may be used, for example, to determine a fill level or limit level of a fill material. Such measuring devices are used in particular to determine a certain level of a fill material, e.g. in a container, i.e. to determine whether a predefined upper or lower limit of the level in the container has been reached. In radiometric measuring devices, gamma emitters are used as senders, i.e. to generate a useful signal that may be received by a detector. In some cases, the signal received by the detector may be superimposed by an interfering signal. The interfering signal may be generated by an extraneous radiation source, for example by radioactive isotopes, e.g. measurement isotopes, such as those used to test welds in containers. This may interfere with the measurement of the measuring device itself, but also with other machines located in the area of the measuring device.

Survey of the Invention

It is therefore the task of the invention to provide an improved radiometric measuring device.

This task is solved by the objects of the independent patent claims. Advantageous embodiments are indicated in the dependent claims, the following description and the figures.

One aspect of the invention relates to a radiometric measuring device for determining an intensity of an interference signal from an external radiation source during a level or limit determination of a fill material in a container. The radiometric measuring device has a detector which is set up to receive pulses of a useful signal modulated with a modulation frequency from a gamma emitter and additionally pulses of the interference signal from the external radiation source. The number of pulses per time corresponds to the intensity of the gamma sources, i.e. for example the useful signal and/or the interference signal. A detector for gamma radiation may be a counting tube, e.g. a Geiger-Müller counting tube, or a scintillation counter. The detector may, for example, count the number of ionizing particles, each of which is detected, for example, as a pulse in the detector. The number of particles and/or pulses may be summed up within a predefined period of time and/or related to a predefined period of time, e.g. "1000 particles (or pulses) per second". As a particle source providing a useful signal, a gamma emitter may be used. The useful signal, from the gamma emitter, may be modulated, i.e. may be an actively clocked emitter, which has a frequency, i.e. a modulation or clocking frequency. The frequency of the modulated useful signal may be substantially constant. In addition to the useful signal, the detector may receive pulses of an interfering signal from an extraneous radiation source. The interfering signal may be unmodulated. For example, the interfering signal may be generated, for example, by radioactive measuring isotopes, isotopes for welding seam testing or other gamma sources whose radiation is variable, in particular variable in an unpredictable manner. Receiving the useful signal and the interfering signal may be done during a level or limit determination, wherein the fill level or limit level of a fill material in a container is measured. One of the effects utilized by the present invention is that the useful signal is modulated and the interfering signal is unmodulated.

The measuring device further comprises an averaging device which is configured to output a first count rate of the pulses. The count rate may be expressed as a rate, i.e. as a number of pulses per unit of time and/or over a certain period of time, the count rate may also be a number of pulses normalized to this certain period of time. In this case, the first count rate corresponds to an average value of a first number of pulses within a predefined time period, which is received by the detector over the predefined time period.

The measuring device further comprises a bandpass system configured to output a second count rate of the pulses. The bandpass system comprises a bandpass with, for example, an adjustable passband frequency range. The adjustable passband frequency range of the bandpass corresponds to the modulation frequency of the modulated useful signal from the gamma emitter. "Adjustable passband" may mean that the passband may be adjusted prior to measurement, e.g. to the frequency range of the modulated useful signal. If the frequency of the modulated useful signal is known and constant, this corresponds to a bandpass with a fixed passband. "Adjustable passband" may also mean that the frequency of the modulated wanted signal is determined—e.g. by means of an FFT module (FFT: Fast Fourier Transform)—e.g. at the beginning of the measurement and the bandpass is adjusted to this passband. The frequency band of the bandpass may be selected according to the frequency of the strongest signal output by the detector, which, for example, corresponds to the strongest amplitude in the FFT spectrum. The FFT module may be part of the bandpass system. "Adjustable passband" may also mean that the frequency of the modulated useful signal is also detected during the measurement and the bandpass is adjusted to this passband. The frequency of the modulated useful signal may change, for example, due to temperature fluctuations during the measurement. In this case, the second count rate corresponds to a second number of pulses within the predefined time period; this second number of pulses is received by the detector in the passband frequency range of the bandpass over the predefined time period.

Furthermore, the measuring device comprises a subtractor, which is configured to form a differential count rate. The differential count rate corresponds to and/or correlates with a difference between the first count rate and the second count rate. Before subtracting the second count rate from the first count rate, the first and/or the second count rate may be normalized, e.g. by means of a constant. After the subtraction, the differential count rate may also be normalized.

Thus, the differential count rate corresponds to the intensity of the interfering signal from the external radiation source.

Because the useful signal is modulated, but the interference signal is unmodulated, the interference signal may be separated from the useful signal by means of the measuring device according to the invention. Thus, by means of the measuring device, not only a measured value for the level or limit level determination of a fill material may be derived from the received—modulated plus unmodulated—signal, but also the presence of an extraneous radiation and/or the strength of the extraneous radiation may be determined, i.e. a quantitative value for the extraneous signal may be determined by means of the measuring device. By determining the quantitative value for the interfering signal, not only may the extraneous radiation be suppressed very efficiently, but the value may also be used to initiate predefined actions, such as a display and/or documentation of the interfering signal.

In one embodiment, the differential count rate is compared to a threshold value and, if the threshold value is exceeded, an action is triggered. The threshold value may be a count rate above which the presence of extraneous radiation is detected. The threshold value may be a count rate above which at least one partial function of the measuring device and/or at least one partial function of other devices is disturbed in a significant manner.

In one embodiment, the action includes suspending a temperature control. The temperature control may, for example, concern the scintillation counter of the measuring device and/or the temperature control of other devices. This may be, for instance, due to the fact that if the external radiation exceeds a certain threshold, some temperature controls may be disturbed in such a way that the function of these temperature controls can no longer be relied upon and therefore the suspension of these temperature controls may prevent damage.

In one embodiment, the action includes storing a timestamp and/or a value of the intensity of the interference signal. The time stamp may, for example, denote the beginning and/or the end of the occurrence of the interference signal. The value of the intensity of the interference signal may include the intensity, the average of the intensity, e.g. over a part of the measured time period, and/or several intensities of the interference signal at several points in time. This may be stored, e.g. in a non-volatile memory, and may be read out again later for diagnostic purposes, e.g. to document (e.g. external) extraneous radiation times.

In one embodiment, the action includes issuing a warning. The warning may comprise a warning light, a warning tone and/or the display of a certain display content.

The aforementioned actions may be triggered individually, together, sequentially or in any combination.

In one embodiment, the measuring device further comprises a frequency determination module configured to determine the modulation frequency of the modulated useful signal from the gamma emitter and to adjust the passband frequency range of the bandpass filter with adjustable passband frequency range to the modulation frequency of the modulated useful signal. This may be done, for example, by means of an FFT module, which determines the frequency of the strongest signal output by the detector and uses this frequency to set the passband of the adjustable bandpass. By using this device, no tuning between the frequency of the modulated useful signal and the detector is required. Furthermore, it allows continuous adaptation to a changed frequency of the useful signal.

In one embodiment, the adjustable passband frequency range of the bandpass has a centre frequency between 0.05 and 20 Hertz, in particular of 1 Hertz. The frequency of the modulated useful signal—and thus of the bandpass tuned to it—changes relatively slowly to the counting rate of the particles. The Q value of the bandpass may, for example, be less than 20%, in particular less than 10%. The modulated useful signal essentially retains its frequency and at most changes slowly, e.g. due to changes in the ambient temperature.

In one embodiment, the predefined time period during which the first and second count rates are measured is between 0.02 and 50 seconds, for example between 0.05 and 20 seconds, and in particular 1 second. This range corresponds in particular to the characteristics of the modulated useful signal.

In one embodiment, the first count rate corresponds to an average value of a first number of pulses received by the detector over a predefined period of time. In this case, the first count rate may be proportional to k times the mean value of the first number of pulses, in particular with $k=\frac{1}{2}$. For example, the first count rate may be multiplied or normalized by the factor $k=\frac{1}{2}$. This may be based, for example, on the fact that in the case of the occurrence of the extraneous radiation, this mean value corresponds approximately to half the measured count rate. It should be noted that in the case of extraneous radiation, this mean value (which is measured at the detector) is increased by the value of the extraneous radiation.

In one embodiment, the measuring device further comprises a modulator which controls a displaceable aperture around the gamma emitter and/or an electronic circuit, wherein the modulator is set up to modulate a signal of the gamma emitter while generating the modulated signal. The movable aperture may be realised, for example, as a rotating screen, e.g. made of lead, which has an opening and rotates around the gamma emitter, so that the gamma rays emerge approximately in the form of a lighthouse with a screen rotating around the lantern. The electronic circuit may be implemented, for example, as a resonant circuit or as a pulse or signal generator plus a D/A converter (possibly with a low-pass filter). The modulated signal may have sinus-form, may be sinusoidal up to a square wave form. The fundamental frequency could advantageously be separable with a simple low-pass filter.

Another aspect of the invention relates to a method for determining an intensity of an interference signal from an extraneous radiation source during a level or boundary level determination, by means of a radiometric measuring device as described above and/or below. The method comprises the following steps:
  a) receiving, by means of a detector, pulses of a useful signal modulated with a modulation frequency from a gamma emitter and, in addition, the interfering signal from the external radiation source;
  b) outputting a first count rate, by means of an averager;
  c) outputting a second count rate, by means of a bandpass system;
  d) forming a differential count rate, by means of a subtractor, which subtracts the second count rate from the first count rate; and
  e) outputting the differential count rate.

In one embodiment, steps b) and c) are performed in parallel and/or quasi-parallel. A quasi-parallel execution may be implemented, for example, by means of a monoprocessor system.

In one embodiment, the described method has the following further steps:

f) comparing the differential count rate with a threshold value; and
g) if the threshold value is exceeded, triggering an action.

Another aspect of the invention relates to a use of a measuring device as described above and below for determining the level or limit level of a filling material, in particular of liquids and bulk material.

Another aspect of the invention relates to a program element which, when executed on the processor unit of a measuring device, instructs the measuring device to perform the method as described above and below.

Another aspect of the invention relates to a computer-readable medium on which the program element as described above and below is stored.

Any features described above and below with reference to one aspect of the invention may equally be features of one or more other aspects of the invention. In particular, any features described in relation to the measuring device may also be features and/or steps of the method, and vice versa.

For further clarification, the invention is described with reference to embodiments illustrated in the figures. These embodiments are to be understood only as examples, but not as limitations.

DESCRIPTION OF THE FIGURES

FIG. 1 schematically shows a measuring device 10 according to an embodiment of the present invention. The measuring device 10 comprises a gamma emitter 20 configured to emit a modulated useful signal. The gamma emitter 20 may be driven by a modulator 22, which applies a predefined frequency to the gamma emitter. The gamma emitter 20 may emit the modulated useful signal in a plurality of directions, for example in the direction of a container 95. The container 95 comprises a filling material 90. The fill material 90 may comprise a liquid and/or a bulk material.

Figure 1:
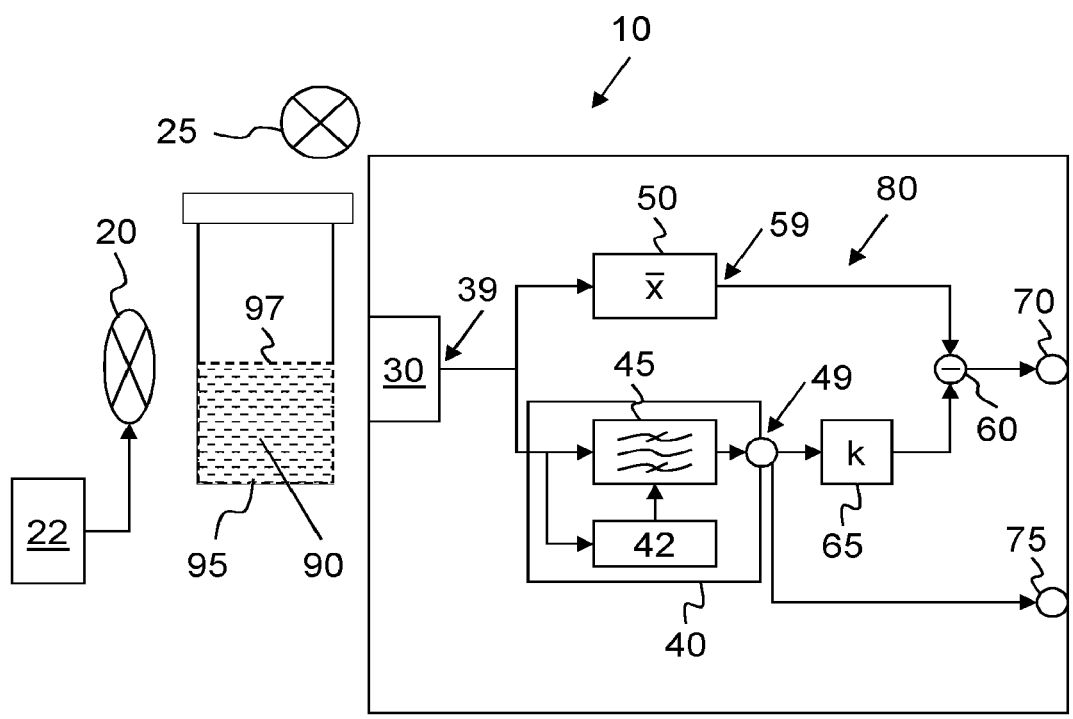
FIG. 1 schematically shows a measuring device according to an embodiment of the present invention.

On the opposite side of the container 95 to the gamma emitter 20 is arranged a detector 30 which is configured to receive pulses from radiation from gamma sources. One of the gamma sources is the gamma emitter 20. The intensity of the gamma rays received by the detector 30 depends on the fill level 97 of the container 95. If the level 97 is so high that the fill material 90 is between the gamma emitter 20 and the detector 30, then the modulated useful signal is attenuated by the fill material 90. If there is no fill material 90 between the gamma emitter 20 and the detector 30, then the detector 30 receives a higher intensity of modulated gamma rays from the gamma emitter 20. This effect may be used to determine the level or boundary level of the fill material 90 in the container 95. However, the detector 30 may not only receive gamma rays from the modulated gamma emitter 20, but the detector 30 may also receive pulses from other gamma sources, for example pulses of the interfering signal from an external radiation source 25. The interfering signal may be unmodulated and consequently may have a different frequency characteristic than the modulated gamma emitter 20.

The pulses generated by the detector 30 are directed, from the detector output 39 of the detector 30 in the measuring device 10, to an averaging frame 50 and a bandpass system 40. The averager 50 is configured to output a first count rate N1 of the pulses at an averager output 59. For this purpose, the averager 50 averages a first number of pulses within a predefined time period. The pulses may comprise the entire frequency spectrum received by the detector 30. Accordingly, the average value of the averager 50 counts all pulses from the detector 30 within the predefined time period.

The bandpass system 40 comprises a bandpass 45 with an adjustable passband frequency range. The bandpass 45 may be adjusted to a passband frequency range, for example, by means of an FFT module 42. The passband frequency range may correspond to the frequency of the modulated useful signal. The passband frequency range may be set, for example, at the beginning of a measurement and/or during the measurement. By means of the bandpass filter 45, essentially only those pulses are filtered out of the pulses received from the detector 30 that are within the passband frequency range. The bandpass system 40 counts these pulses and passes them—if necessary after normalization—as a second count rate N2 to the bandpass system output 49. The normalization may also be performed subsequently to the bandpass system output 49, in a normalization module 65. The second count rate N2 may be fed to a first output 75 of the measuring device 10.

A differential count rate N3 is formed in a subtractor 60. The differential count rate N3 corresponds to and/or correlates with a difference between the first count rate N1 and the second count rate N2. The differential count rate N3 may be fed to a second output 70 of the measuring device 10. Thus, a useful signal measurement value is present at the outputs of the measuring device 10, namely at the first output 75, and a interference signal measurement value is present at the second output 70. Both measured values may be used by downstream modules (not shown). The measurement device 10 may comprise, at least in part, one or more processing units 80. In this regard, the processor unit 80 may comprise at least the averaging module 50, the bandpass system 40 and/or the normalization module 65.

Figure 2:
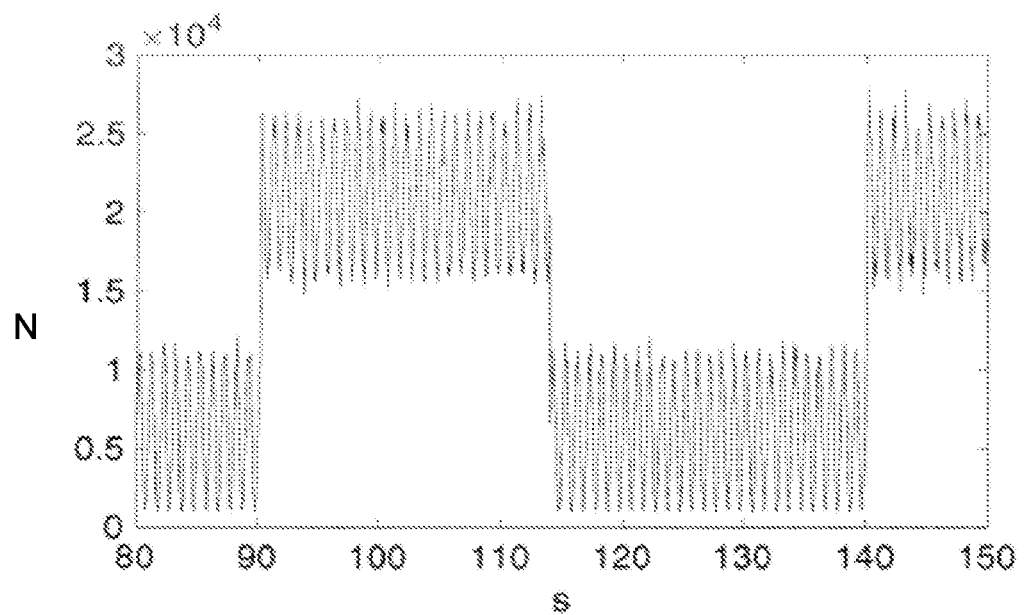
FIG. 2 schematically shows an example of an input signal of a detector receiving a modulated useful signal and an interference signal.

FIG. 2 schematically shows an example of an output signal 39 of a detector 30 (see FIG. 1) which receives a modulated useful signal and an interference signal. The x-axis shows a timeline on which measured values in a time range of 80 s to 150 s are plotted. They axis shows a count rate N as may be measured at the output signal 39 of the detector 30. The sine waves of the modulated useful signal from the gamma emitter 20 are clearly visible. The sine waves are superimposed with an unmodulated interference signal in a time range from 90 s to about 115 s and from 140 s onwards. In the undisturbed range 80 s to 90 s, and 115 s to 140 s, the count rate varies approximately between 0.1 and $1.1 \times 10^4$ pulses per second, and in the disturbed range the count rate varies approximately between 1.6 and $2.6 \times 10^4$ pulses per second. Thus, in this example, an amplitude of the interfering signal is higher than an amplitude of the modulated useful signal. All numerical values are purely exemplary.

Figure 3:
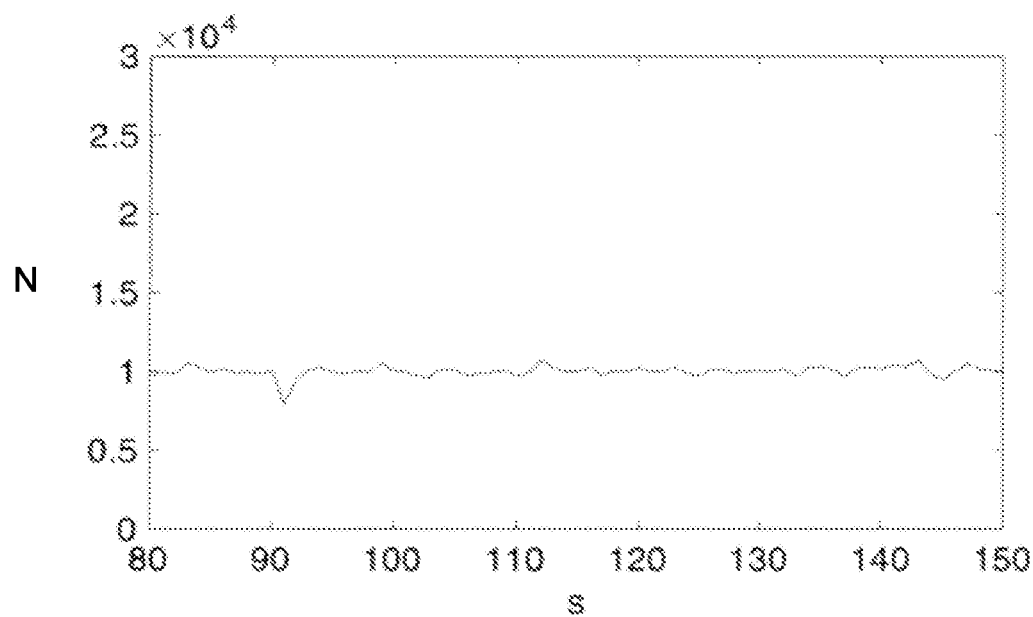
FIG. 3 schematically shows an example of the signal of FIG. 2 at the output of a bandpass system according to the present invention.

FIG. 3 schematically shows an example of the useful signal of FIG. 2 at the bandpass system output 49 of the bandpass system 40 (see FIG. 1) after bandpass filtering. The x-axis and the y-axis show the same time ranges and count rates, respectively, as FIG. 2. The curve shown represents the useful signal as it may be measured at an output 75 of the measuring device 10. It is clear that the count rate essentially oscillates around a value of 1.0×104 pulses per second. Thus, in the time range shown, the level 97 in the container 95 does not change or changes only marginally.

Figure 4:
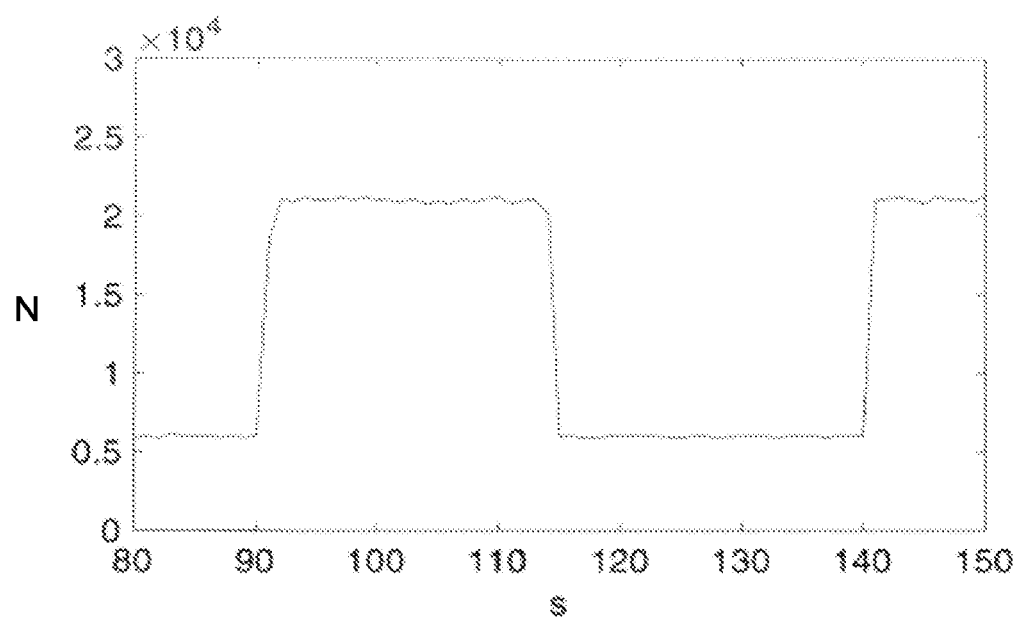
FIG. 4 shows schematically an example of the signal of FIG. 2 at the output of an averaging system according to the present invention.

FIG. 4 schematically shows an example of the signal of FIG. 2 at the mean value image output 59 of a mean value imager 50 (see FIG. 1). The x-axis and the y-axis show the same time ranges or count rates as FIG. 2. This represents the averaged useful signal plus interference signal.

Figure 5:
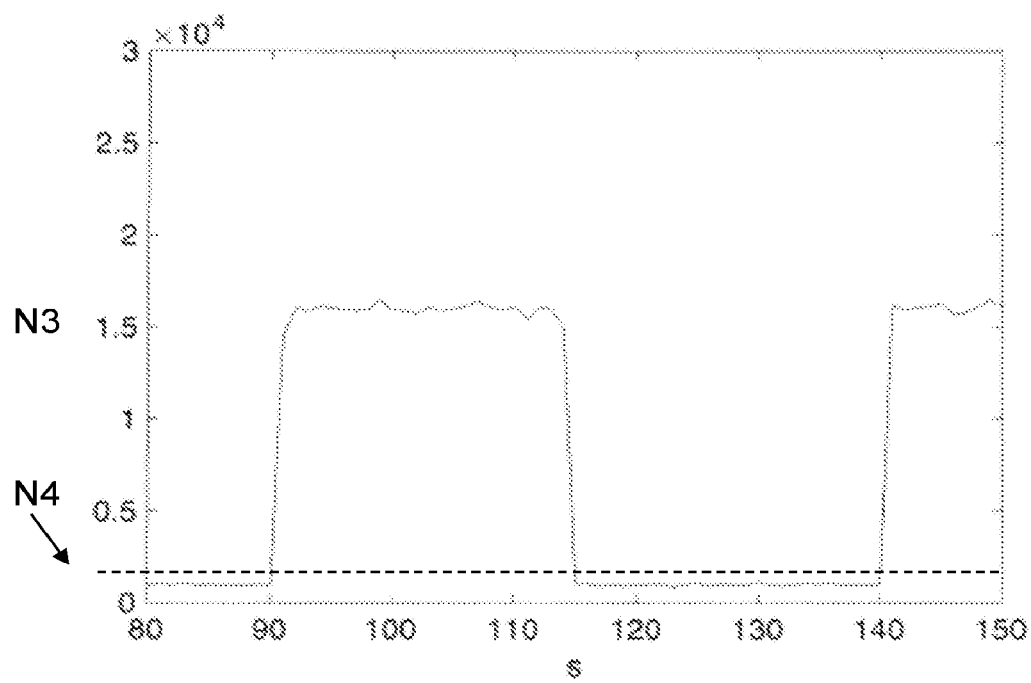
FIG. 5 shows schematically an example of the signal of FIG. 2 at the output of a measuring device in one embodiment of the present invention.

FIG. 5 schematically shows an example of the signal of FIG. 2 at the output 70 of a measuring device 10 (see FIG. 1). The x-axis and the y-axis show the same time ranges or count rates as FIG. 2. This represents the pure interference signal, i.e. the differential count rate N3. This signal may be further processed, for example, by comparing the differential count rate N3 with a threshold value N4 (dashed) and triggering an action if the threshold value N4 is exceeded. The action may be, for example, a message "Interference signal present" on a connected display.

Figure 6:
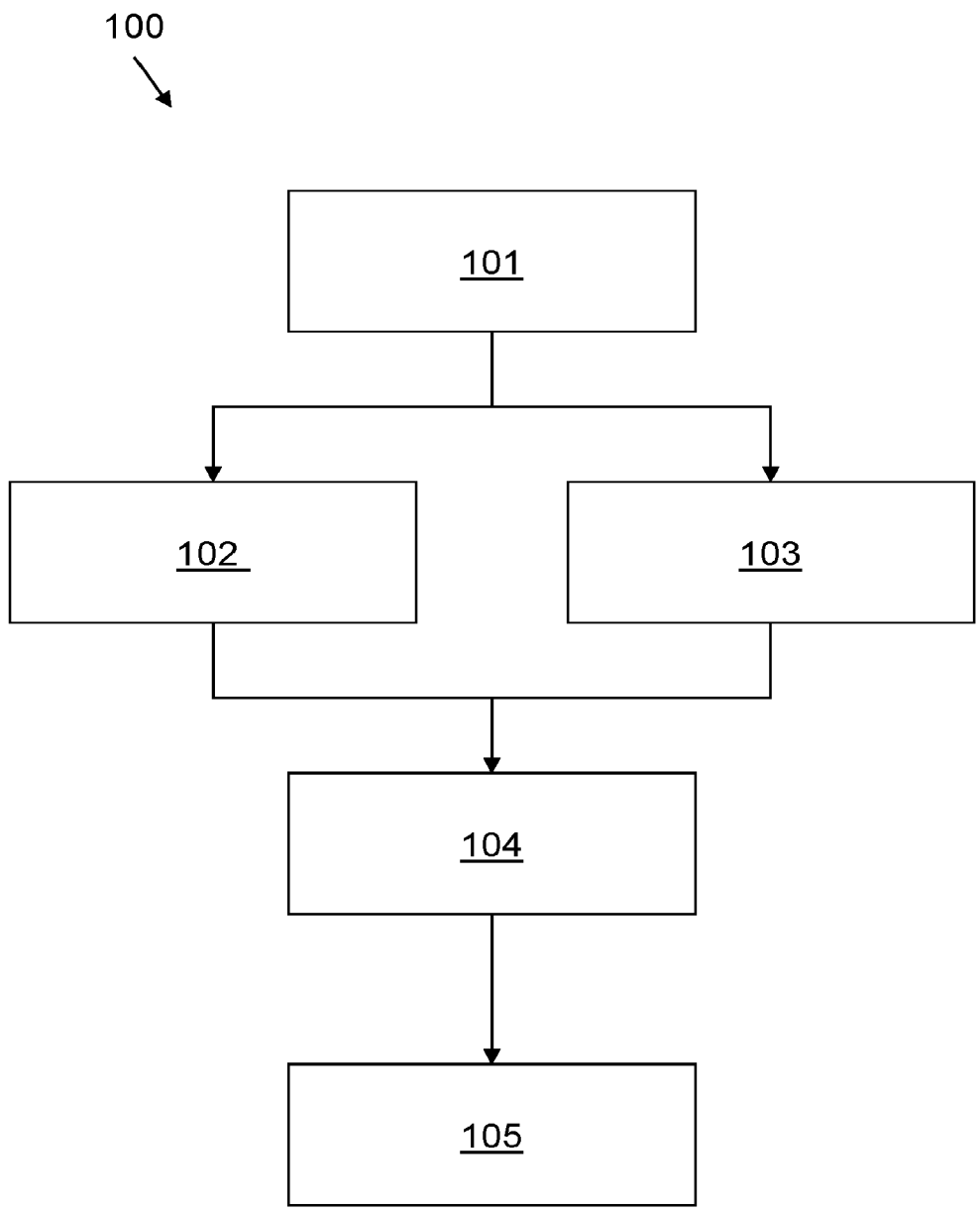
FIG. 6 shows a flow chart illustrating steps of a method according to an embodiment of the present invention.

FIG. 6 shows a flowchart 100 illustrating steps of a method according to an embodiment example of the present invention. In a step 101, by means of a detector 30 (see FIG. 1), pulses of a useful signal modulated with a modulation frequency are received from a gamma emitter 20 and, in addition, an interference signal is received from the external radiation source 25. In a step 102, a first count rate N1 is output by means of an averager 50. In a step 103, a second count rate N2 is output by means of a bandpass system 40. The steps 102 may be performed in parallel, quasi-parallel or sequentially (102 after 103, or 103 after 102). In a step 104, a differential count rate N3 is formed by means of a subtractor 60, the differential count rate N3 subtracting the second count rate N2 from the first count rate N1. In a step 104, the differential count rate N3 is output.

It should be further noted that "comprising" and "comprising" do not exclude other elements or steps, and the indefinite articles one or "a" do not exclude a plurality. It should also be noted that features or steps described by reference to any of the above embodiments may also be used in combination with other features or steps of other embodiments described above. Reference signs in the claims are not to be regarded as limitations.

LIST OF REFERENCE SIGNS

10 radiometric measurement device
20 gamma emitter
22 modulator
25 external radiation source
30 detector
39 detector output
40 bandpass system
42 frequency determination module, FFT module
45 bandpass filter
49 bandpass system output
50 averaging module
59 averager output
60 subtractor
65 normalization module
75, 70 first and second output of the measurement device
80 processing unit
90 fill material
95 container
97 fill level
101-105 steps of flowchart 100

The invention claimed is:

1. A radiometric measuring device for determining an intensity of pulses of an interference signal from an external radiation source during a filling level or limit level determination of a filling material in a container, the radiometric measuring device comprising:
   detector circuitry configured to receive pulses of a useful signal modulated with a modulation frequency from a gamma emitter and additional pulses of the interference signal from the external radiation source;
   averager circuitry configured to output a first count rate of the pulses at an output of the averager circuitry,
   wherein the first count rate corresponds to an average of a first number of pulses within a predefined time period received from the detector circuitry over the predefined time period; and
   a bandpass system including a bandpass filter having a passband frequency range configured to output a second count rate of the pulses at a bandpass system output,
      wherein the passband frequency range of the bandpass filter corresponds to the modulation frequency of the modulated useful signal from the gamma emitter, and
      wherein the second count rate corresponds to a second number of pulses within the predefined time period received by the detector circuitry in a bandpass frequency range of the bandpass filter over the predefined time period; and
   subtractor circuitry configured to form a differential count rate, wherein the differential count rate corresponds to a difference between the first count rate and the second count rate, such that the differential count rate corresponds to an intensity of the interfering signal from the external radiation source.

2. The radiometric measuring device according to claim 1, wherein the differential count rate is compared with a threshold value and, if the threshold value is exceeded, an action is triggered.

3. The radiometric measuring device according to claim 2, wherein the action includes suspending a temperature control.

4. The radiometric measuring device according to claim 2, wherein the action includes storing a time stamp and/or a value of an intensity of the interference signal.

5. The radiometric measuring device according to claim 2, wherein the action includes issuing a warning.

6. The radiometric measuring device according to claim 1, wherein the radiometric measuring device fluffier includes a frequency determination module configured to determine the modulation frequency of the modulated useful signal from the gamma emitter and to adjust the passband frequency range of the bandpass filter with adjustable passband frequency range to the modulation frequency of the modulated useful signal.

7. The radiometric measuring device according to claim 1, wherein the passband frequency range of the bandpass filter has a center frequency between 0.05 and 20 Hertz, in particular of 1 Hertz.

8. The radiometric measuring device according to claim 1, wherein the predefined period of the counting rates is between 0.02 and 50 seconds, for example between 0.05 and 20 seconds, and in particular 1 second.

9. The radiometric measuring device according to claim 1, wherein the first counting rate is proportional to k times a mean value of the first number of pulses, in particular with k=½.

10. The radiometric measuring device according to claim 1, further comprising:
a modulator driving a movable aperture around the gamma emitter and/or an electronic circuit,
wherein the modulator is configured to modulate a signal from the gamma emitter to produce the modulated signal.

11. A method of determining an intensity of an interference signal from an external radiation source during a fill level or boundary level determination, by way of a radiometric measuring device for determining an intensity of pulses of an interference signal from an external radiation source during a filling level or limit level determination of a filling material in a container, the radiometric measuring device including a detector configured to receive pulses of a useful signal modulated with a modulation frequency from a gamma emitter and additional pulses of the interference signal from the external radiation source, an averager configured to output a first count rate of the pulses at an output of averager circuitry, wherein the first count rate corresponds to an average of a first number of pulses within a predefined time period received from the detector over the predefined time period, and a bandpass system including a bandpass filter having a passband frequency range configured to output a second count rate of the pulses at a bandpass system output, wherein the passband frequency range of the bandpass filter corresponds to the modulation frequency of the modulated useful signal from the gamma emitter, and wherein the second count rate corresponds to a second number of pulses within the predefined time period received by the detector in a bandpass frequency range of the bandpass filter over the predefined time period, and a subtractor configured to form a differential count rate, wherein the differential count rate corresponds to a difference between the first count rate and the second count rate, such that the differential count rate corresponds to the intensity of the interfering signal from the external radiation source, the method comprising:
receiving, by way of the detector, pulses of a useful signal modulated with a modulation frequency from a gamma emitter and, in addition, the interfering signal from the external radiation source;
outputting a first count rate, by way of the averager;
outputting a second count rate, by way of a bandpass system;
forming a differential count rate, by way of the subtractor, which subtracts the second count rate from the first count rate; and
outputting the differential count rate.

12. The method according to claim 11, further comprising:
comparing the differential count rate with a threshold value; and
if the threshold value is exceeded, triggering an action.

13. A non-transitory computer-readable medium having stored thereon a program that when executed by a computer causes the computer to implement a method of determining an intensity of an interference signal from an external radiation source during a fill level or boundary level determination, by way of a radiometric measuring device for determining an intensity of pulses of an interference signal from an external radiation source during a filling level or limit level determination of a filling material in a container, the radiometric measuring device including a detector configured to receive pulses of a useful signal modulated with a modulation frequency from a gamma emitter and additional pulses of the interference signal from the external radiation source, an averager configured to output a first count rate of the pulses at an output of averager circuitry, wherein the first count rate corresponds to an average of a first number of pulses within a predefined time period received from the detector over the predefined time period, and a bandpass system including a bandpass filter having a passband frequency range configured to output a second count rate of the pulses at a bandpass system output, wherein the passband frequency range of the bandpass filter corresponds to the modulation frequency of the modulated useful signal from the gamma emitter, and wherein the second count rate corresponds to a second number of pulses within the predefined time period received by the detector in a bandpass frequency range of the bandpass filter over the predefined time period, and a subtractor configured to form a differential count rate, wherein the differential count rate corresponds to a difference between the first count rate and the second count rate, such that the differential count rate corresponds to the intensity of the interfering signal from the external radiation source, the method comprising:
receiving, by way of the detector, pulses of a useful signal modulated with a modulation frequency from a gamma emitter and, in addition, the interfering signal from the external radiation source;
outputting a first count rate, by way of the averager;
outputting a second count rate, by way of the bandpass system;
forming a differential count rate, by way of the subtractor, which subtracts the second count rate from the first count rate; and
outputting the differential count rate.

* * * * *